United States Patent [19]

Ouellet

[11] Patent Number: 4,838,540

[45] Date of Patent: Jun. 13, 1989

[54] SAILBOARD SIMULATOR

[75] Inventor: George Ouellet, Powell River, Canada

[73] Assignee: Force 4 Enterprises Inc., Calif.X°

[21] Appl. No.: 235,559

[22] Filed: Aug. 24, 1988

[51] Int. Cl.⁴ .............................................. G09B 9/06
[52] U.S. Cl. ...................................... 272/1 B; 272/17;
   272/54; 272/146; 272/97; 434/60; 434/247;
   434/253
[58] Field of Search ................... 272/1 B, 1 R, 17, 54,
   272/97, 146; 434/60, 247, 253; 114/39.1, 39.2

[56] References Cited

U.S. PATENT DOCUMENTS

| | | | |
|---|---|---|---|
| 4,436,513 | 3/1984 | Darby | 272/146 X |
| 4,449,940 | 5/1984 | Berger | 434/60 |
| 4,749,180 | 7/1988 | Boomer | 272/1 B X |

FOREIGN PATENT DOCUMENTS

| | | | |
|---|---|---|---|
| 2941839 | 4/1981 | Fed. Rep. of Germany | 434/60 |
| 2496472 | 6/1982 | France | 272/1 B |
| 1081646 | 5/1984 | U.S.S.R. | 434/60 |

Primary Examiner—David A. Scherbel
Assistant Examiner—Richard E. Chilcot, Jr.
Attorney, Agent, or Firm—Fetherstonhaugh & Co.

[57] ABSTRACT

A sailboard simulator has a movably supported simulated sailboard and devices for effective movement of simulation sailboard relative to its support. A mast extends upwardly from its sailboard and a wishbone is secured to the mast. The devices for effecting movement comprises of a pulling member flexibly connected to the mast at a point spaced from the mast and a device for displacing the pulling member to simulate the action of a sail on its mast.

13 Claims, 6 Drawing Sheets

SAILBOARD SIMULATOR

FIELD OF THE INVENTION

The present invention relates to a sailboard simulator and, more particularly, to a simulator having a simulation sailboard on which the user stands while the simulation sailboard is used in a manner simulating the action of a real sailboard.

BACKGROUND OF THE INVENTION

At the present time, the sport of sailboarding is becoming more and more popular. Since, however, only one person can use a sailboard at a time, it is not possible for an instructor to remain with a learner in order to teach the learner except, of course, while the sailboard remains relatively static.

A further disadvantage of the conventional sailboard is that when, by an error of judgement on the part of the user, the mast is released so that the mast and the sail fall into the water, considerable effort is required to raise the mast and, moreover, the raising the mast by a person standing on the sailboard requires considerable agility and balancing skill by that person.

A still further disadvantage of a conventional sailboard, from a point of view of a learner or, indeed, of a more experienced user, is that the user is necessarily exposed to the atmospheric elements, which may necessitate the wearing of suitable heat-insulating clothing or which may even be sufficiently severe to prevent altogether the use of the sailboard.

In addition, there exists a need for a sailboard simulator which enables sailboarding to practiced indoors and at anytime and, if desired, in a manner which enables the performance of the user to be recorded and measured, for example, for competitive purposes.

BRIEF SUMMARY OF THE INVENTION

It is accordingly an object of the present invention to provide a novel and improved sailboard simulator.

It is a further object of the present invention to provide a sailboard simulator having a sailboard on which the user stands and which is displaced in simulation of the action of a real sailboard.

According to the present invention, a sailboard simulator comprises a simulated sailboard, means for moveably supporting the simulated sailboard, means for effecting movement of the simulated sailboard relative to the supporting means in simulation of the movement of a real sailboard when in use, a mast extending upwardly from the simulated sailboard and a wishbone secured to the mast. The means for effecting movement comprise a pulling member means forming a flexible connection between the pulling member and the mast, the connection means comprising a connection member which is fixed to the mast and extends to a point spaced2ert from the mast, the end of the cable being flexibly secured to the connection member at the point, and means for displacing the pulling member to simulate the action of a sail on the mast.

By thus securing the pulling member to the connection member at a point offset from the mast, the pull exerted by the pulling member in a correspondingly off-set manner simulates the action of the wind on a sail attached to the mast. To that end, the point at which the pulling member is attached to the connection member is preferably located at a position, relative to the mast, which would correspond to the centre of pressure of a sail if the sail were attached to the mast.

In a preferred embodiment, the pulling member comprises a cable and is provided with means for winding and unwinding the cable in order to exert pulling force on the mast through the connection member.

The connection member preferably comprises an arm extending at an angle to the mast.

BRIEF DESCRIPTION OF THE DRAWINGS

Further objects, features, and advantages of the present invention will appear from the following description thereof when taken in conjunction with the accompanying drawings in which.

THE PREFERRED EMBODIMENT

Figure 1:
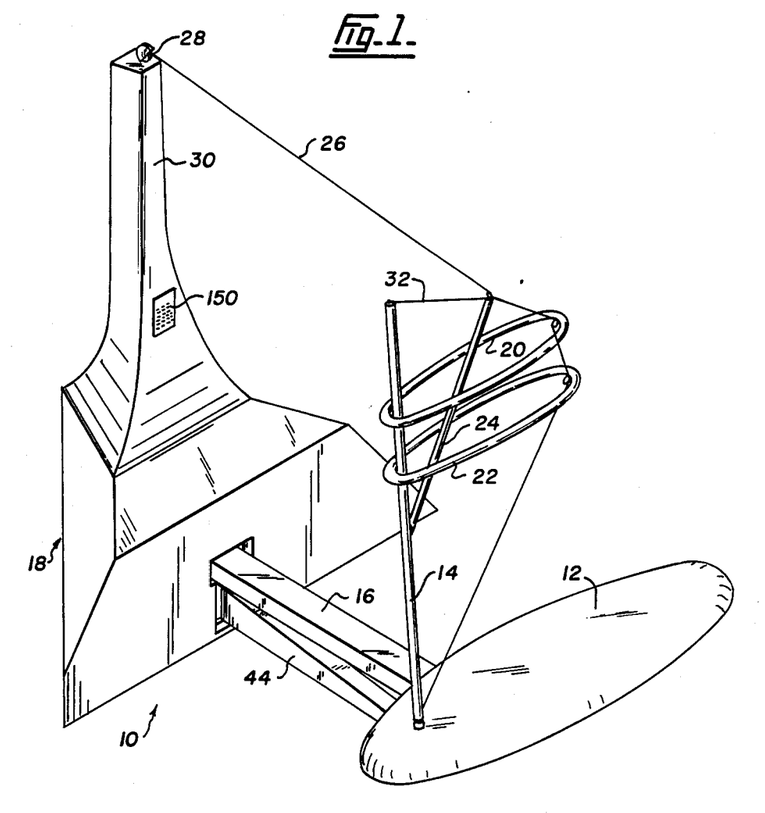
FIG. 1 shows a view in perspective of a sailboard simulator according to the present invention.

Referring firstly to FIG. 1 of the accompanying drawings, there is shown a sailboard simulator indicated generally by reference number 10 which has a simulation sailboard 12 provided with a mast 14, the sailboard 12 being mounted on one end of a support beam 16.

The opposite end of the support beam 16 is concealed within a casing indicated generally by reference 18.

The mast 14 is provided with an upper wishbone 20 and a lower wishbone 22, and with an arm 24 which extends upwardly at an angle to the mast 14 from, approximately, the mid-point of the mast 14.

The arm 24 is fixedly secured at its lower end to the mast 14 and, at its upper end, is flexibly secured to one end of a pulling cable 26, which extends from a pulley 28 located at the top of an upright post-like portion 30 of the casing 18.

A reinforcement cable 32 is secured at one end thereof to the top of the mast 14 and extends therefrom to the top of the arm 24, and then is attached to the aft ends of the two wishbones 20 and 22, the other end of the cable 32 being secured to the mast 14 at a location close to the foot of the mast 14.

Referring now to FIGS. 2 through 6 of the drawings, which show the simulator of FIG. 1 with parts removed and, in particular, with the casing 18 omitted in order to reveal the internal structure of the simulator, it will be seen that the simulator includes a framework indicated generally by the reference 34.

Figure 2:
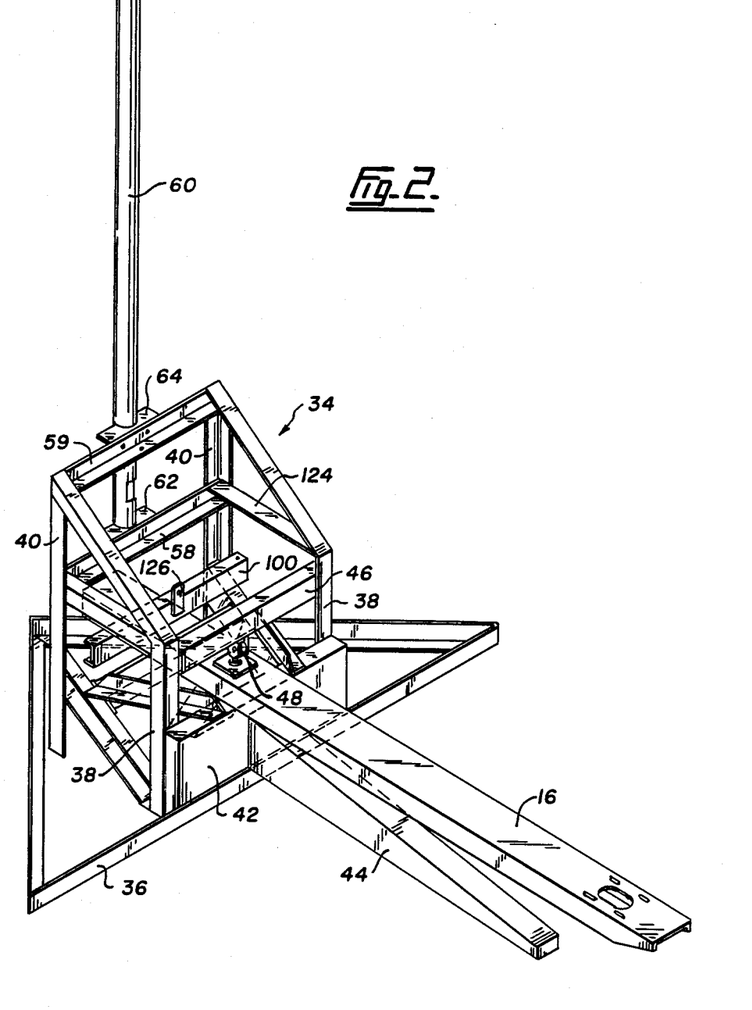
FIG. 2 shows a view in perspective of the simulator of FIG. 1 with parts thereof removed to reveal the basic structure of the apparatus.

The framework 34 has a triangular base 36, and two front vertical channel members 38, and two rear vertical channel members 40, extending vertically upwardly from the triangular base 36.

A front plate 42 is welded to the front vertical channel members 38 and to the front of the triangular frame 36, and a stabilizer arm 44 is welded at its rearmost end to the frontplate 42 and projects forwardly therefrom, beneath the support beam 16.

A horizontal channel member 46 extends between and is welded to the tops of the front vertical channel members 38, and the support beam 16 is suspended from the centre of the horizontal channel member 46 by means of a universal joint 48.

Figure 3:
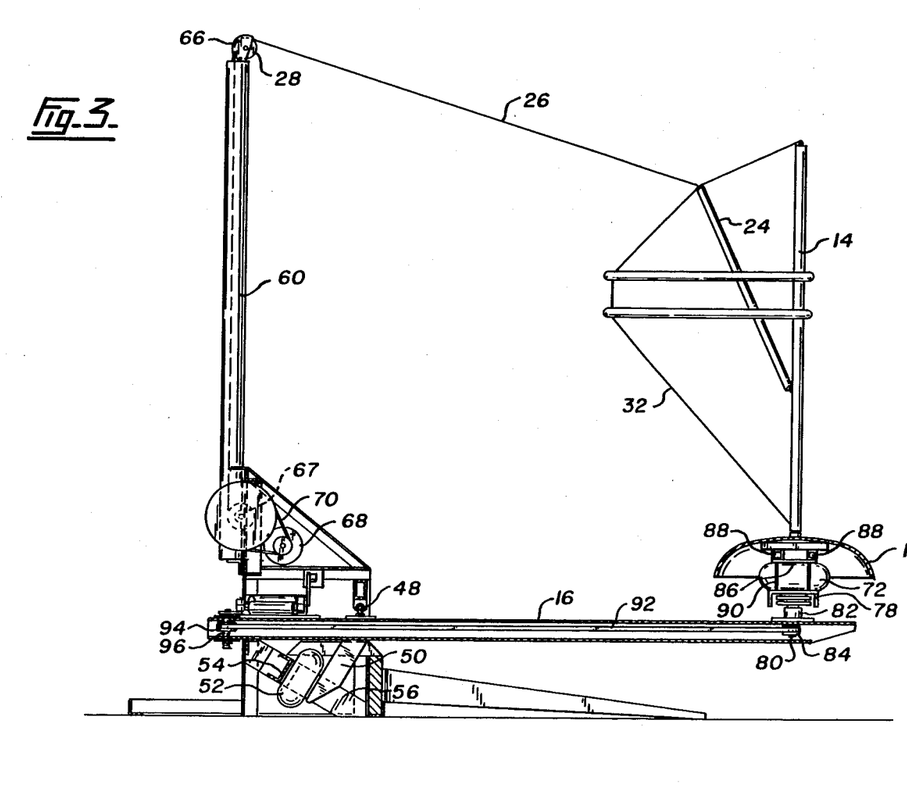
FIG. 3 shows a view inside elevation of parts of the simulator.

As shown in FIG. 3, a downwardly inclined arm 50 extends from the underside of the support beam 16, beneath the universal joint 48, and the lower end of the arm 50 rests against one side of an inflatable cushion or bellows 52.

The bellows 52, the operation of which is described in greater detail below, is used to balance the weight of the support beam 16 and the components which are carried thereby at the upper end of the support beam 16, as described below.

The cushion 53 is mounted on a horizontal channel member 54, which is secured at opposite ends to a pair of inclined channel members 56, which in turn are secured to the front vertical channel members 38 and the rear vertical channel members 40.

The universal joint 48 allows pivotation of the support beam 16 in the vertical plane, i.e. in the plane of FIG. 3, and in the horizontal plane, i.e. perpendicular to the plane of FIG. 3. In addition, the universal joint 48 allows the support beam 16 to rock to and fro about an axis extending longitudinally of the support beam 16 through the central pivotation of the universal joint 48.

A tubular post 60 extends upwardly from the framework 34 and is secured to and supported by the framework 34.

More particularly, a pair of horizontal channel members 58 and 59 extend between and are secured to the rear vertical channel members 40 and the tubular post 60 is secured to the horizontal channel members 58 and 59 by means of brackets 62 and 64 welded to the channel members 58 and 59, respectively, and to the tubular post 60.

The pulling cable 26 extends from the top of the arm 24 to the pulley 28, which is mounted in a pulley housing 66 at the top of the tubular post 60. From the pulley 28, the pulling cable 26 extends downwardly through the interior of the tubular post 60 to a wind-up reel - 67, which is driven by an electric motor 68 through a belt and pulley transmission 70.

The simulation sailboard 12 is supported on the end of the support beam 16 by means of an air bellows or cushion 72 and a support plate 78, which is supported on the upper end of a shaft 80. A vertical bearing 82 on the top of the support beam 16 is interposed between the support plate 78 and the beam 16 and retains the shaft 80, which extends downwardly into the support beam 16 and through a pulley 84 located within the support beam 16.

The air bellows 72 is sandwiched between the support plate 78 and a further plate 86, which is mounted on top of the bellows 72 and which, in turn, supports the simulation sailboard 12 through supports brackets 88.

The bellows 72 is resilient, so as to allow rocking motion of the sailboard 12 relative to the support beam 16, but the extent of such rocking motion is limited by the provision of retainer wires 90, of which only two are shown in FIG. 3, and which are equiangularly spaced around the bellows 72, the retainer wires 90 being secured out opposite ends thereof to the plates 78 and 86.

A transmission belt 92 extends round the pulley 80 and also around a pulley 94 at the rear end of the support beam 16, remote from the simulation sailboard 12, the rear pulley 94 being mounted on a vertical shaft 96 and the transmission belt 92 extending almost the entire length of the support beam 16 within the interior of the support beam 16.

Figure 6:
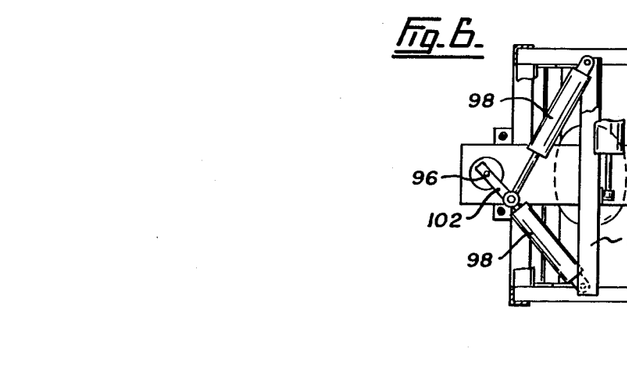
FIG. 6 shows a view taken in cross-section along the VI—VI of FIG. 3.
Figure 7:
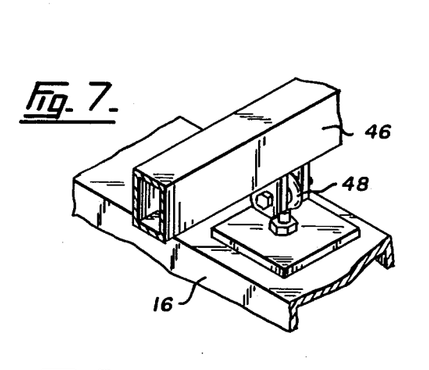
FIG. 7 shows a broken-away area in perspective of the suspension of a support beam in the apparatus of FIG. 1.
Figure 8:
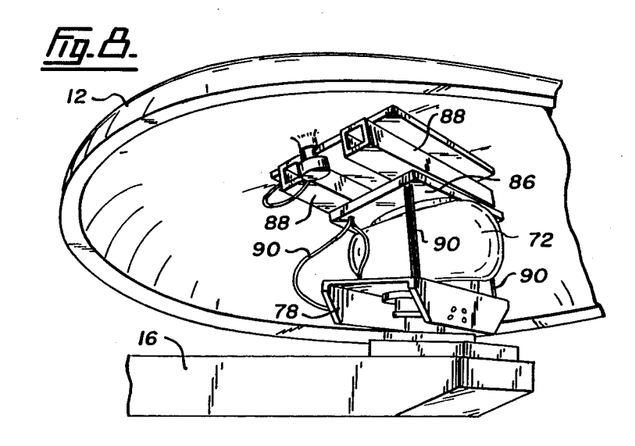
FIG. 8 shows a broken-away view in perspective, from below, of the mounting of the sailboard support beam.

As shown in FIG. 6, a pair of shock absorbers 98, which are anchored at opposite ends of a channel member 100, are pivotally connected at their opposite ends to an arm 102, which is fixed to the upper end of the shaft 96. The channel member 100 is welded to the support beam 16 and extends transversely thereof.

With this arrangement, the sailboard 12 is able to rotate about the axis of the shaft 80. However, such rotation of the sailboard 80 causes corresponding rotation of the pulley 84 and, through the belt 92, of the pulley 94 and the shaft 96 and, thus, of the arm 102. The rotation of the arm 102, and thus the rotation of the sailboard 12 about the axis of the shaft 80, is damped by the two shock absorbers 98 connected to the arm 102. These shock absorbers 98 allow rotation of the arm 102 and, thus, of the sailboard 12 through 360°.

Figure 4:
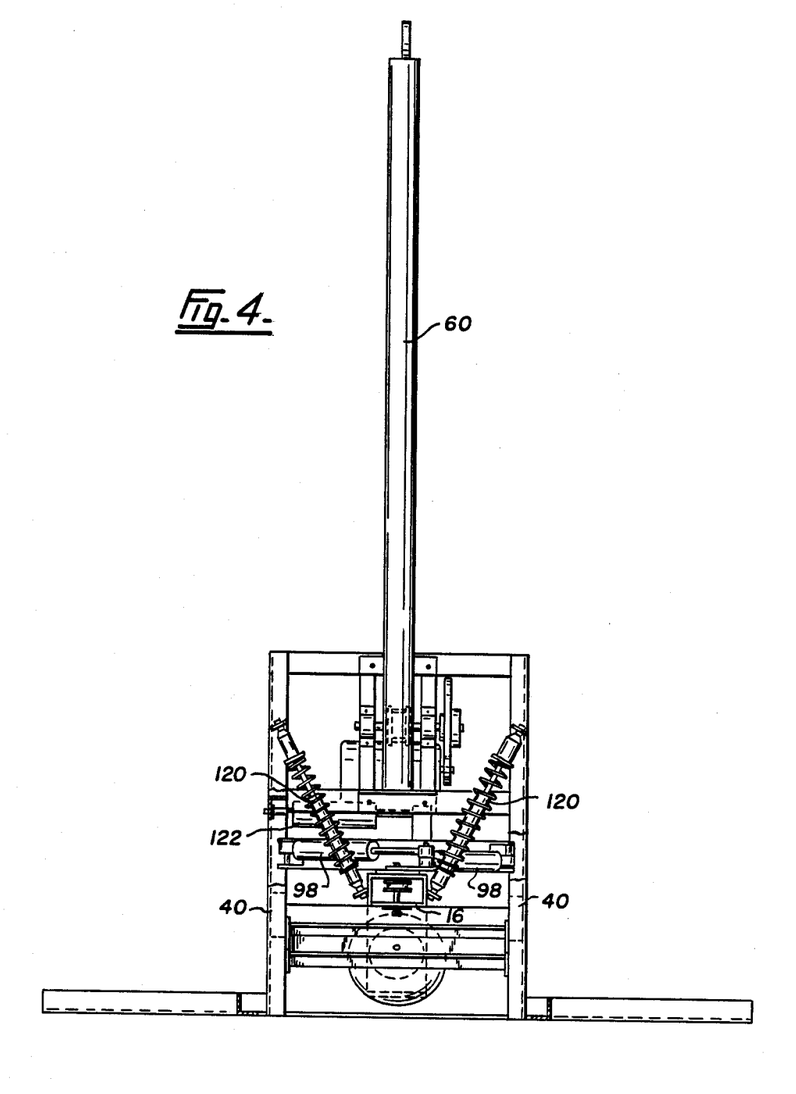
FIG. 4 shows a view in rear elevation of the simulator parts of FIG. 3.

As shown in FIG. 4, a pair of shock absorbers 120 are connected between the rear vertical channel members 40 and opposite sides of the rear end of the support beam 16. These shock absorbers 120 serve to damp the rocking and pivotal motion of the support beam 16.

Figure 5:
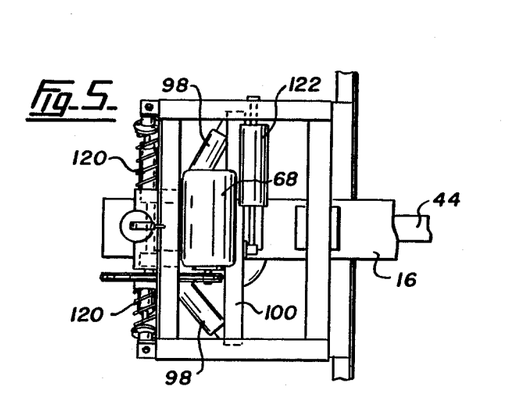
FIG. 5 shows a broken-away view taken in cross-section along the line V—V of FIG. 3.

Such motion is produced by means of a pneumatic piston and cylinder device 122, shown in FIG. 5, which is connected between a horizontal side channel member 124 forming part of the frame structure 34 and a vertical lug 126, which extends upwardly from the mid-point of the transverse channel member 100 secured to the beam 16.

In operation of the above-described device, the electric motor 68 is energized to wind the cable 26 onto the take-up reel 67.

This causes the cable 26 to exert a pulling action at its point of attachment to the arm 24, i.e. at the top of the arm 24. This point of attachment is off-set from the mast 13 at a location such that the effect of the pulling of the cable 26 on the mast 14 simulates the action of the wind at the centre of pressure of a sail if the sail were attached to the mast 14.

The user of the simulator, standing on the sailboard 12 and gripping one or the other of the wishbones 20 and 22, can effect relative rotation of the mast 14 and the sailboat 12 and, when the pull on the cable 26 is released, can restore the mast 14 to a position from which it has previously been pulled by the cable 26.

The pull of the cable 26 can also cause the sailboard 12 to be rocked relative to the support beam 16, such rocking motion being permitted by the resilience of the bellows 72.

Meanwhile, the support beam 16 can be caused to pivot vertically and horizontally, and to rock about a longitudinal axis as described above, relative to the framework structure 34 by means of the universal joint 48, such motion being effected at least partially by the pneumatic piston and cylinder device 122, the action of which can be such as to simulate the action of waves on the sailboard 12.

Figure 9:
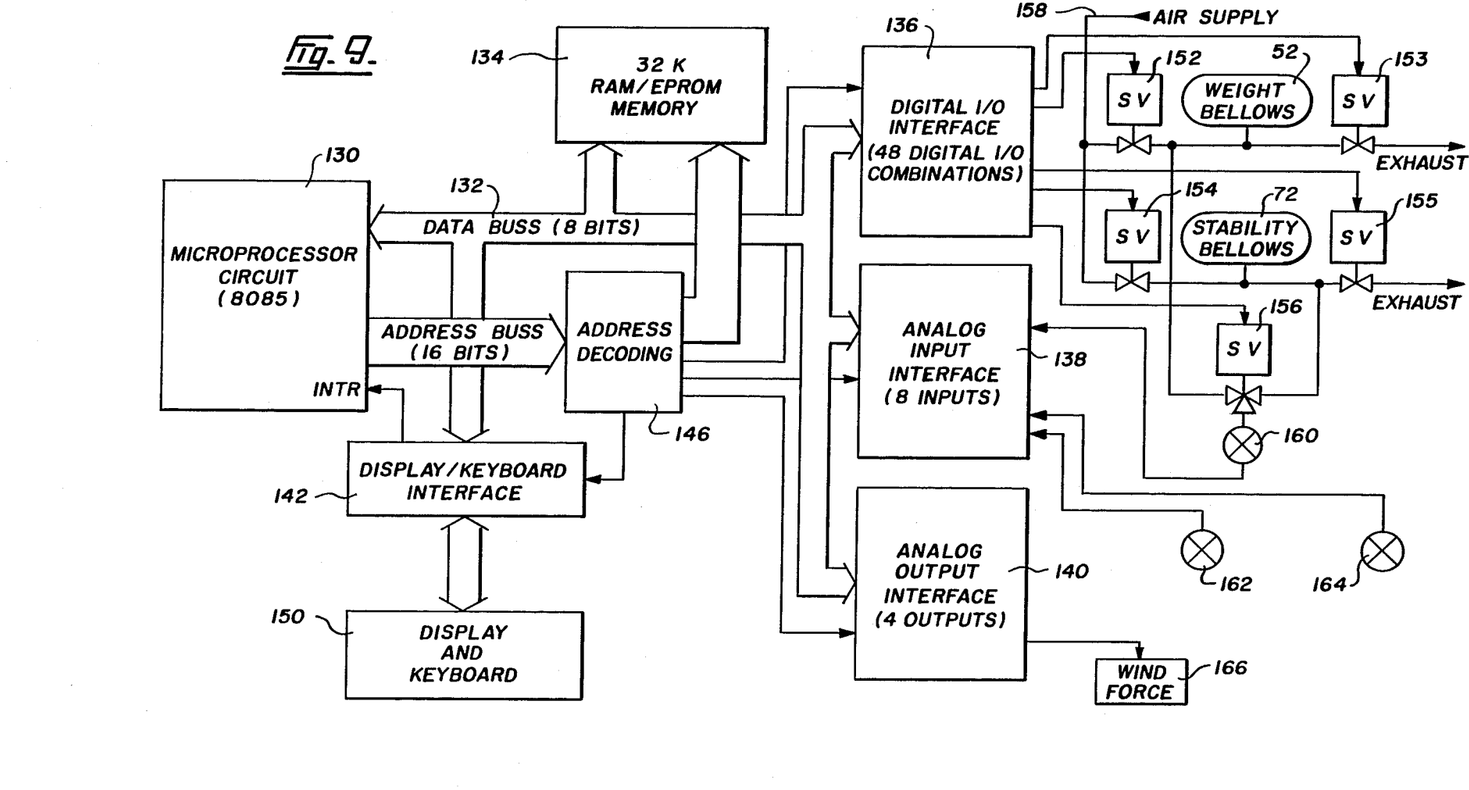
FIG. 9 shows a block diagram of the control system of the sailboard simulator of FIGS. 1 to 8.

The above-described operation can be controlled and adjusted by the control system illustrated in FIG. 9.

This control system comprises a microprocessor 130 which is connected by a data bus 132 to a RAM/EPROM memory 134, a digital input/output interface 136, an analog input interface 138, an analog output interface 140 and a display/keyboard interface 142.

The microprocessor 130 is also connected by an address bus 144 to an address decoder 146, the output of which is connected by a bus 148 to the memory 134.

The display/keyboard interface 142 is connected to a display and keyboard 150 which, as shown in FIG. 1, is conveniently located on the front of the simulator casing 18. The digital input/output interface 136 controls five slide valves 152 through 156, which are connected to a compressed air supply duct 158 extending from an air compressor bracket (not shown).

The slide valves 152 and 153 control the inflation of the bellows 52 and, thus, the balancing of the support arm 16, while the slides 154 and 155 control the bellows 72 and, thus, the stability of the sailboard 12.

Slide valve 156 serves to connect the output of the slide valve 152, and the input of the slide valve 155, to a pressure transducer 160, the output of which is connected to the analog input interface 138 for providing a corresponding feedback to the microprocessor 130.

Further transducers 162 and 164, which respond, respectively, to the angle of the sail, i.e. the rotation of the mast 14, relative to the sailboard 12 and the angle of the sailboard 12 relative to the wind, i.e. relative to the support arm 16, provide corresponding feedback signals to analog input interface 138 and, thus, to the microprocessor 130.

The output from the analog output interface 140 operates a transducer 166 for controlling the wind force, i.e. for controlling the energization of the electric motor 68 and, thus, the pulling of the cable 26.

Various modifications may be made to the above-described apparatus within the scope of the present invention.

For example, instead of employing a single post 60 with a single pulling cable 26 connected to the open end of the arm 26, a pair of posts arranged in a vertical Y-shaped array could be provided with a pair of cables extending to the arm 26 from correspondingly different directions. With this arrangement, the direction and the resultant force exerted on the arm 24 by the two cables, as the mast is pivoted, may be varied to enhance the similarity to the effect of wind on a sailboard sail in use.

I claim:

1. A sailboard simulator, comprising:
   a simulation sailboard;
   means for movably supporting said simulated sailboard;
   means for effecting movement of said simulation sailboard relative to said supporting means;
   a mast extending upwardly from said simulation sailboard; and
   a wishbone secured to said mast;
   said means for effecting movement comprising: a pulling member;
   means forming a flexible connection between said pulling member and said mast, at a point spaced from said mast; and
   means for displacing said pulling member to simulate the action of a sail on said mast.

2. A sailboard simulator as claimed in claim 1, wherein said pulling member comprises a cable, said means for effecting movement further comprising means for winding and unwinding said cable.

3. A sailboard simulator as claimed in claim 2, wherein is fixed to said mast and an arm extends at an angle to said mast from said mast to said point, said pulling member being secured to said arm at said point.

4. A sailboard simulator, comprising: a simulation sailboard;
   a support beam carrying said simulation sailboard at one end of said support beam;
   a support structure for supporting said support beam;
   means for suspending said support beams from said support structure at a spacing from said simulation sailboard and for allowing rocking motions of said support beam in the vertical and horizontal directions relative to said support structure
   drive means connected to said support beam for imparting said rocking motions to said support beam; and
   means for controlling the operation of said drive means 5. A sailboard simulator as claimed in claim 4, wherein said drive means comprise piston and cylinder means connected between said beam and said support structure.

6. A sailboard simulator as claimed in claim 4, further comprising means supporting said simulation sailboard for rotation relative to said support beam about an axis perpendicular to said support beam.

7. A sailboard simulator as claimed in claim 6, including means for damping the rotation of said simulation sailboards relative to said support beam.

8. A sailboard simulator as claimed in claim 6, wherein said suspension means comprise means allowing a further rocking motion of said support means around an axis extending longitudinally of said support beam and said drive means include means for effecting said further rocking motion.

9. A sailboard simulator, comprising:
   a simulated sailboard
   means for movably supporting said simulation sailboard;
   means for effecting movement of said simulation sailboard relative to said supporting means;
   a mast extending upwardly from said simulation sailboard; and
   a wishbone secured to said mast;
   said means for effecting movement comprising; a pulling member; means forming a flexible connection between said pulling member and said mast at a point spaced from said mast;
   means for displacing said pulling member to simulate the action of a sail on said mast; a support beam carrying said simulation sailboard at one end of said support beam; a support structure for supporting said support beam;
   means for suspending said support beam from said support structure at a spacing from said simulation sailboard and for allowing rocking motions of said support beam in the vertical and horizontal direction relative to said support structure.
   drive means connected to said support beam for imparting said rocking motion to said support beam; and
   means for controlling the operation of said drive means.

10. A sailboard simulator as claimed in claim 9, wherein said pulling member comprises a cable, said means for effecting movement further comprising means for winding and unwinding said cable.

11. A sailboard simulator as claimed in claim 10, wherein is fixed to said mast and an arm extends at an angle to said mast from said mast to said point, said pulling member being secured to said arm at said point.

12. A sailboard simulator as claimed in claim 9, wherein said drive means comprise piston and cylinder means connected between said beam and said support structure.

13. A sailboard simulator as claimed in claim 9, further comprising means supporting said simulation sailboard for rotation relative to said support beam about an axis perpendicular to said support beam.

* * * * *